Feb. 4, 1930.                G. W. YANSS                1,745,968
                              FENDER GUARD
                           Filed July 23, 1928
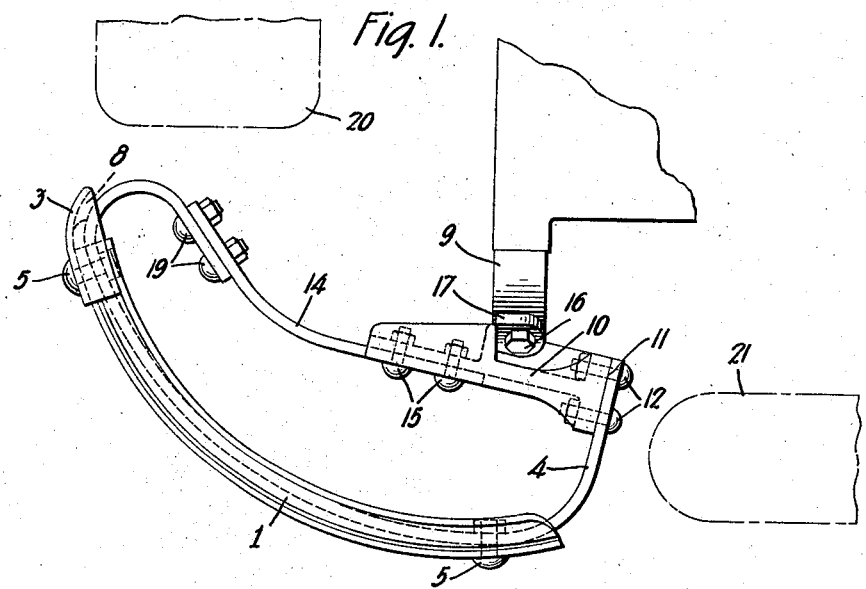
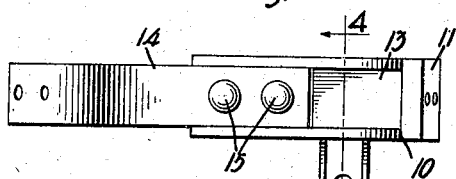
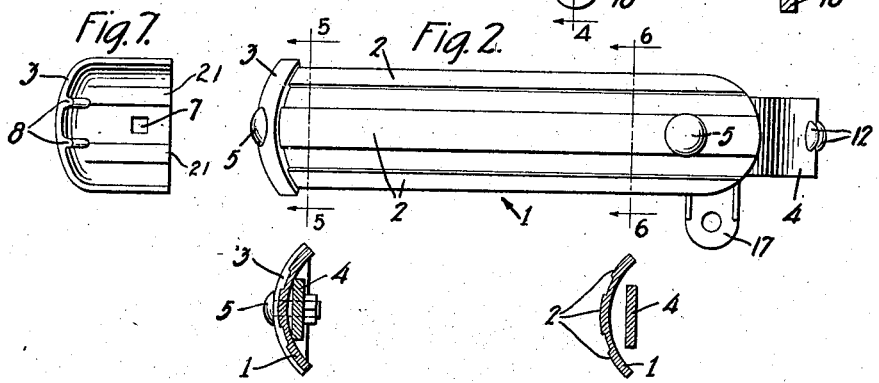
Inventor
George W. Yanss.
by
Attorney Patented Feb. 4, 1930

1,745,968

UNITED STATES PATENT OFFICE

GEORGE W. YANSS, OF ADRIAN, MICHIGAN, ASSIGNOR TO AMERICAN CHAIN COMPANY, INC., A CORPORATION OF NEW YORK

FENDER GUARD

Application filed July 23, 1928. Serial No. 294,681.

This invention relates to automobile bumpers and more particularly to a type of fender guard which combines to a desirable extent the resiliency of a bumper fabricated of strip steel, with certain of the features heretofore considered to be exclusively characteristic of a tubular bumper, and notably the spacious curved impact surface which is presented by various types of existing oversized tubular bumpers.

In explanation of the above statement, it is to be observed that early types of tubular bumpers embodied tubes of relatively small diameter which presented an attenuated impact surface and were unsightly, and that these disadvantages were only obviated in part when parallel tubes were used. In general, tubular bumpers are more rigid than is usually desirable, if used without other shock-absorbing means.

The oversized tubular bumpers, to which reference has already been made, are less unsightly, but their size is limited by an undesirable increase in the amount of material used, as the diameter is increased, adding to their expense, weight, and bulk, unless their resistance to crumpling action under impact is sacrificed by making the walls of the tubes thin.

On the other hand, the use of flat steel strips to constitute the impact members of bumpers has substantial manufacturing advantages and affords a bumper in which the desired degree of resiliency or rigidity can be readily provided for, but heretofore it has been the practice in providing a bumper made of steel strips to secure breadth of impact surface by increasing the number of steel strips arranged in the impact plane rather than to provide a single broad strip, primarily for the reason that a very broad flat strip presents an unsightly appearance.

In pursuance of the object first stated above, therefore, the present invention provides a strip of steel of considerably greater breadth than that conventionally used in bumpers of the single bar type, the bumper strip provided in accordance with this invention being preferably of concave-convex cross-section and of such radius of curvature and breadth that when in use the bumper presents, viewed from in front or at the sides, the appearance of a tubular bumper having a spacious curved impact surface of pleasing aspect. This surface may be plain or ribbed or otherwise treated to vary the design, and it affords an extremely serviceable and effective impact area from whatever direction the shock of impact is received.

A bumper thus constructed, while semi-rigid, that is to say, more rigid than would be a flat steel strip of the same cross-section, nevertheless possesses more resiliency than does a tubular bumper member, whatever the size of the latter.

A bumper constructed in accordance with the present invention may have a curvature which causes it to present the effect of a larger bar than would be practicable with any bumper having a complete tubular section. For the same reason, a bumper of this novel construction will have a greater strength for a given weight of material employed, inasmuch as substantially all of the material may be concentrated in the portion of the bumper exposed for impact.

A further object of the invention is to provide a supporting bar which is of narrower stock than the impact bar and will be concealed thereby. Also the supporting bar is bent on a radius less than that of the impact bar and contacts therewith at a plurality of separated points thereby permitting a latitude of differing radii which may be used in both bars and still permit their attachment. This difference in radii between both bars provides a greater degree of resiliency than could be obtained by bars of the same radius.

A clear conception of the construction and further objects of the invention may be had from the following specification, in conjunction with the accompanying drawings, in which Fig. 1 discloses a fender guard in plan view;

Fig. 2 is a front view of Fig. 1;

Fig. 3 is a detail front view of the attaching member;

Fig. 4 is a cross-section through 4—4 of Fig. 3;

Fig. 5 is a cross-section through 5—5 of Fig. 2;
Fig. 6 is a cross-section through 6—6 of Fig. 2; and
Fig. 7 is a rear view of the cap used on the outer end of this type of fender guard.

In the embodiment of the invention selected for illustration and description, the part designated by the reference character 1 is an impact member of a fender guard which may be made of any suitable material, and is preferably formed of a strip of flexible steel having in accordance with the invention a forwardly convex impact surface 2 of sufficient breadth and curvature to afford the appearance of a complete tube when observed from any position ordinarily occupied by an observer standing on the ground in the vicinity of the bumper. Preferably the breadth of this impact member is considerably greater than that of ordinary single strip bumpers, and the forwardly convex surface is preferably of approximately cylindrical contour and of a radius substantially greater than that of conventional oversized tubular bumpers.

In its now-preferred form such an impact member may be conveniently formed by rolling a steel strip into concavo-convex cross-section, and the impact surface may be plain or formed with longitudinal ribs 2 as shown, which may be of any suitable number and contour, but preferably having three ribs of approximately rectangular cross-section. These ribs may be given a different finish from that of the adjacent portion of the impact surface, as, for instance, by japanning of the latter and imparting a polished finish, such as nickeling, to the ribs.

The inner end of the bar 1 may be formed with a curved portion as shown, while the other end is preferably covered by a cap 3 which may be either japanned, to match the bar 1, or nickeled, as desired. The cap 3 is formed to carry out the effect of a tubular bumper.

The impact bar is shown as secured to a supporting bar 4 having its outer end formed in a loop and its inner end bent at approximately right angles to the general contour of the bar. It will be noted in Figs. 1 and 6 that the radius of curvature of bar 4 is such that a considerable space remains between the inner face of the impact bar and the supporting bar, when they are in their assembled relation. This permits the impact bar being used with supporting bars of varying radii and gives a greater latitude in manufacture. This space also provides more resiliency in the bumper and insures sufficient room for the bending of bar 4 under certain conditions of impact.

The impact bar is secured by any suitable means to the supporting bar 4, as by bolts 5 which pass through holes provided in both bars. One of the bolts is also passed through a square hole 7 in cap 3, which hole is provided to be positioned about a squared shoulder of the bolt and thereby keep the cap from rotating. Lugs 8 on the rear of the cap, as shown in Fig. 7, are also provided for cooperating with the bar 4 to retain the cap in position, and the ribs 21 are adapted to cooperate with the grooves formed on the face of the bar 1.

The impact bar with its attached supporting bar is secured to a frame member 9 of a vehicle in the instance illustrated by an attaching member 10 and a back bar 14. The attaching member 10 is preferably formed of cast steel and is shown having right angle flanges on both sides of the shank of a central T-shaped portion as shown in Fig. 1. The inner end of bar 4 is secured to face 11 of the cross piece of the T-shaped member 10 by bolts 12, and the back bar 14 is secured in the channel portion 13 formed by the flanges by means of bolts 15. The member 10 has a pair of ears or lugs 17 and 18 which approximate the contour of frame member 9 and to which they are secured by bolts 16.

The free end of back bar 14 is secured to the outer looped end of supporting bar 4 by bolts 19, and the back bar is so formed that the end of the fender guard is positioned near the fender 20 and gives complete rearward protection thereto. The other end of the guard is so positioned that free access is permitted to the spare tire 21.

A bumper constructed as above described may be formed with any desired degree of rigidity, and will desirably have a greater degree of resiliency than any bumper of completely cylindrical or tubular cross-section. It is to be noted that such completely tubular bumpers in general do not afford any useful degree of resiliency for many purposes, and as already noted the diameter of such bumpers is limited by the tendency to an undue increase in weight and bulk except with the sacrifice of proper thickness of walls, if the tubular bumper is to be capable of resisting the crumpling action of a shock under impact, whereas such shocks can be sustained with impunity with the structure herein described, inasmuch as the concave-convex bars can be made of any desired thickness suitable to sustain the impacts likely to be encountered in use, and will retain their convex form uninjured after any but the most destructive shocks, while absorbing completely all the minor shocks, without injury to the vehicle or its occupants.

I also wish it to be understood that any suitable means for securing together the various parts of the bumpers or fender guards may be provided in place of the bolts shown at different regions, inasmuch as the parts may be welded or otherwise secured, without departing from the spirit of the invention.

I claim:

1. An automobile fender guard comprising an impact member formed of a broad strip of resilient metal presenting a convexly curved impact surface of suitable extent and curvature to present the appearance of a cylindrical tube, said impact member concealing and being mounted upon a resilient bar.

2. An automobile fender guard comprising an impact member formed of a broad strip of resilient metal presenting the appearance of a cylindrical tube, said member being secured to and concealing throughout its length a flat bar of resilient metal.

3. An automobile fender guard comprising an impact member formed of a broad strip of resilient metal presenting the appearance of a cylindrical tube, a supporting bar of flat strip resilient metal narrower than said member, said bar and said member being arcuate in form but of different radii of curvature, said member being secured to and concealing said bar and being spaced therefrom to permit deformation of said member under impact.

4. An automobile fender guard comprising a resilient impact member of arcuate form, a supporting bar also of arcuate form but of different radius of curvature, said supporting bar being spaced from said impact member to permit deformation of the latter under impact, and means for securing said supporting bar and impact member to the frame of an automobile.

5. In a fender guard of the type described, an attaching member comprising a casting of substantially T shape, the lateral flanges at the edges thereof forming a channel on one side of the shank of said T for the reception of a back bar adapted to be secured thereto, an impact member secured to the cross member of said attaching member at one end and to the free end of said back bar at the other, and means for securing said attaching member to the frame of a vehicle.

6. In a fender guard of the type described, an attaching member comprising a casting of substantially T shape having a recess formed in the shank thereof for the reception of a back bar of said guard, an impact member secured to the cross member of said casting at one end and to the free end of said back bar at the other, a plurality of lugs formed on said casting having substantially the same curvature as the spring horn of a vehicle, and bolts for securing said lugs to the top and bottom of said horn.

7. An attaching member for fender guards of the type described comprising a casting of substantially T shape, a channel shaped groove on one side thereof for accommodating a fender bar, lugs formed thereon having substantially the curvature of the spring horn of a vehicle, and means for securing said member to said horn.

8. An automobile fender guard comprising an impact member of substantially cylindrical appearance, a supporting bar to which said impact member is secured, a back bar of resilient strip metal, an attaching member adapted to embrace said back bar and be secured to the frame of a vehicle, and means for securing one end of said supporting bar to said back bar and the other end to said attaching member.

9. In a fender guard of the type described, an impact member having a convex impact surface, a supporting bar, said member being secured to and concealing said bar with the exception of an end portion and a cap formed to embrace said impact bar and supporting bar at said end and approximately of the same radius of curvature as said impact member, and means for securing said cap to said impact member, said cap having lugs to engage said supporting bar and afford support to said cap.

In testimony whereof, I have signed this specification.

GEORGE W. YANSS.